UNITED STATES PATENT OFFICE.

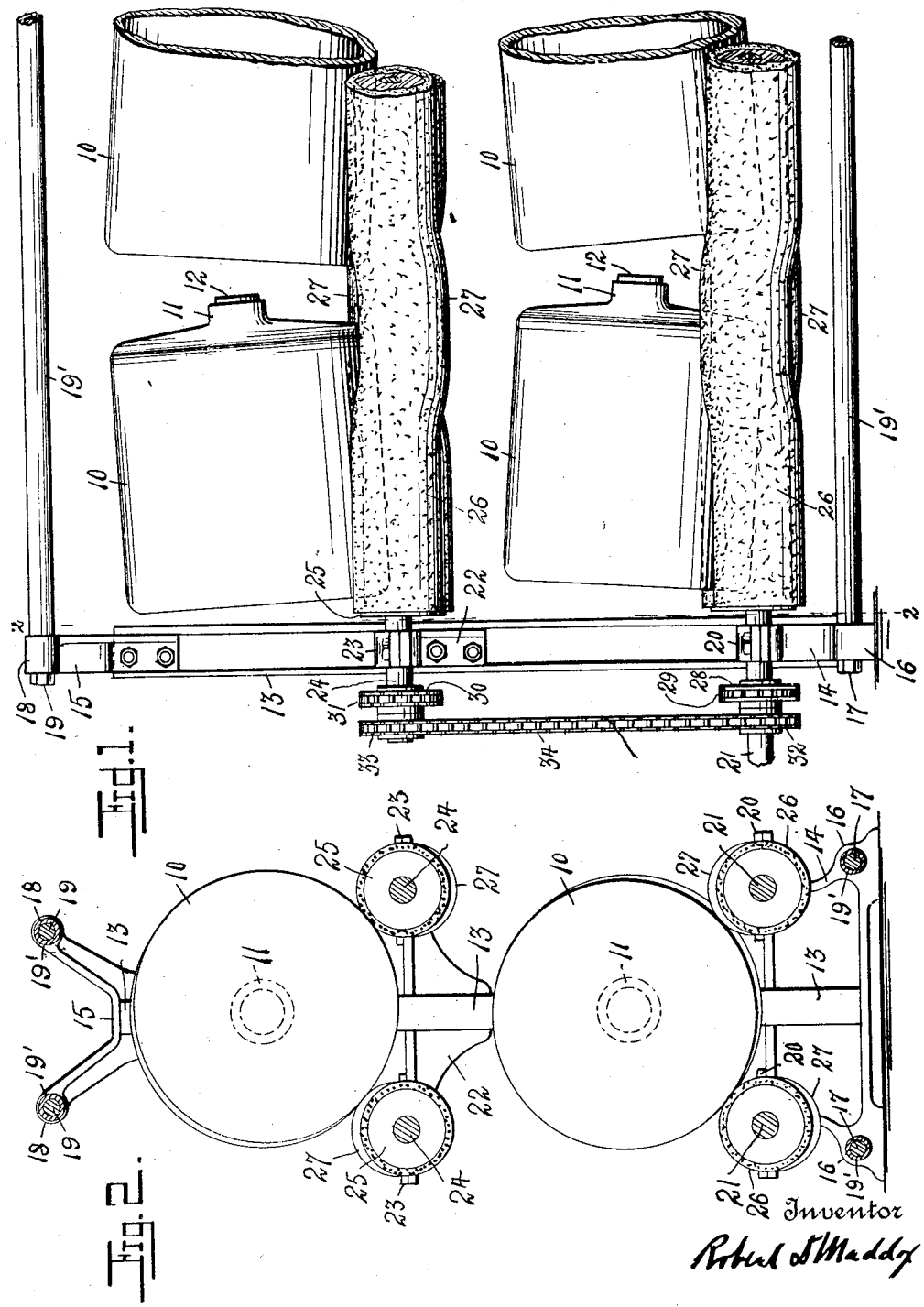

ROBERT D. MADDOX, OF THE UNITED STATES ARMY.

MIXING AND GRINDING APPARATUS IRREGULARLY OPERATED.

1,337,716.  Specification of Letters Patent.  Patented Apr. 20, 1920.

Application filed February 11, 1919. Serial No. 276,432.

(FILED UNDER THE ACT OF MARCH 3, 1883, 22 STAT. L., 625.)

*To all whom it may concern:*

Be it known that I, ROBERT D. MADDOX, major, Medical Department, United States Army, a citizen of the United States, stationed at Washington, D. C., have invented an Improvement in Mixing and Grinding Apparatus Irregularly Operated, of which the following is a specification.

The invention described herein may be used by the Government, or any of its officers or employees in prosecution of work for the Government, or by any other person in the United States, without payment of any royalty thereon.

This invention relates to apparatus for mixing, amalgamating, and grinding various substances or compounds, either dry, liquid, or semi-liquid, and has for one of its objects to produce an apparatus whereby the contents of a container may be thoroughly disintegrated and commingled by rotating the container, the latter being loosely mounted upon rotating rollers.

Another object of the invention is to provide a container adapted to rapidly move its contents from end to end and from side to side while being rotated.

Another object of the invention is to produce a device of this character adapted to support a plurality of independent containers with means for independently rotating them, and so constructed that the containers are loosely supported and adapted to be removed one at a time and replaced by other containers.

With these and other objects in view the invention consists in certain novel features of construction as hereinafter shown and described and then specifically pointed out in the claims; and in the drawings illustrative of the preferred embodiment of the invention.

Figure 1 is a side elevation; and

Fig. 2 is a transverse section on the line 2—2 of Fig. 1.

The improved apparatus comprises primarily a receptacle for the material or product to be mixed or ground and mounted upon rollers disposed in spaced relation and rotated in the same direction, the receptacle being thus correspondingly rotated and the contents thoroughly mixed and commingled. The receptacles are preferably formed cylindrical from end to end, and the rollers are formed with lateral projections in spaced relation with the projections of one roller opposite the spaces of the other roller. By this arrangement when the receptacles are mounted upon the rotating rollers they will be caused to rock or operate unevenly and thus throw the contents backward and forward from end to end of the receptacle, and likewise from side to side. This action materially increases the agitation and thoroughly intermingles and mixes the contents of the receptacle.

The receptacles may be constructed of any suitable material but will preferably be of glass, porcelain lined metal, vitrified ware, lead lined, or otherwise constructed to resist the action of acids or the like. For the purpose of illustration the receptacles, indicated at 10, are each formed with a contracted nozzle or mouth 11, having a suitable stopper indicated at 12, but it is not desired to limit the form of the containers or the material of which they are constructed. The rotating rollers may be of any required length and size and adapted to support any required number of the receptacles. Preferably the rollers will be arranged in pairs one above the other and supported for rotation in a suitable framework. For the purpose of illustration a conventional framework is shown comprising vertical standards 13 of sections of I beams each with a laterally constructed foot or base member 14, and laterally branching head members 15. The base members 14 are provided with bearings 16 through which tie rods 17 are supported, while the head members 15 are provided with bearings 18 to support tie rods 19. The rods 17 and 19 are surrounded by tubular spacing members 19' as indicated in Figs. 1 and 2. By this means the standards 13 are effectually supported in vertical position and in spaced relation. The rotators may be of any required length to correspond to the number of receptacles to be employed.

The base members 14 are formed with bearings 20 to receive the journals of shafts 21. Attached to the standards 13 are bracket devices 22 each carrying a bearing 23 to support the journals of shafts 24. The standards may be of any required height to carry any required number of the brackets, but one set of the brackets only are shown for the purpose of illustration.

The shafts 21—24 support roller devices 25, preferably of wood, and each provided with a jacket or covering 26 of suitable yielding material. The yieldable jackets will preferably be sections of rubber hose stretched over the drums or rollers 26, but may be otherwise constructed, if required.

The rollers 25 are formed with lateral projections or offsets 27 at spaced intervals with the projections of one roller opposite either the offsets or the spaces between the projections of the other roller, so that when the container rests upon the rollers and the latter are rotated in the same direction, the container will be correspondingly irregularly rotated, oscillated and tilted to throw the contents from side to side and from end to end thereof.

The shafts 21 are extended at one end to receive chain wheels 28 over which an endless chain 29 is disposed, and the shafts are likewise extended at one end to receive chain wheels 30 over which an endless chain 31 operates. One of the shafts 24 and one of the shafts 21 are further extended to receive chain wheels 32—33 over which an endless chain 34 operates. The shaft 21 which carries the chain wheels 28 and 32 is further extended as shown in Fig. 1 to receive a rotating medium, not shown.

It will be obvious by this arrangement that when the last mentioned shaft is rotated by any suitable power the sets of rollers will be simultaneously rotated in the same direction through the action of the chains, and when the receptacles 10 are disposed upon the rollers as shown, the receptacles will be rapidly rotated and cause their contents to be thoroughly mixed, ground, or commingled, as before described, and thrown from end to end and from side to side at the same time.

The receptacles being disposed loosely upon the rollers can be removed one at a time and replaced by other receptacles without disturbing the remaining receptacles. Thus compounds or material of various kinds may be operated upon at the same time and the contents of the various receptacles separately retained.

The improved device may be employed for grinding or mixing various substances either powdered, liquid or semi-liquid, as may be required, and will be found of special advantage in grinding or mixing lymph or compounds employed in vaccination or innoculations of various kinds. The device may be arranged for relatively large containers and likewise be employed for mixing concrete, clay and like material or compounds.

Having thus described the invention what is claimed as new is:—

1. An apparatus of the class described including a pair of uniformly rotatable rollers having offsets therein and disposed in lateral spaced relations, said rollers being adapted when rotated to impart oscillatory and tilting vibrations to the content of containers located thereon.

2. An apparatus of the class described including a pair of uniformly rotatable rollers having offsets therein and disposed in lateral spaced relations, and a plurality of rotatable containers arranged end to end upon said rollers and uniformly vibrated, oscillated and tilted thereby to agitate the contents when the rollers are rotated.

3. An apparatus of the class described, a pair of uniformly rotatable rollers having offsets therein and disposed in lateral spaced relation, said rollers being adapted when rotated to impart oscillatory and tilting vibrations to the contents of the containers located thereon, and means apart from the containers for rotating said rollers in a common direction at an equal rate of speed.

4. An apparatus of the class described, coacting rollers having offsets therein and arranged in uniformly rotatable pairs, the rollers of each pair being spaced apart laterally and adapted to impart oscillatory and tilting revolutions to containers placed thereon, means apart from the containers for rotating the rollers of each pair uniformly as to direction and rate of speed, and a frame for supporting said pairs of rollers in vertically spaced relation.

ROBERT D. MADDOX.